United States Patent [19]

Egli

[11] 3,962,154

[45] June 8, 1976

[54] METHOD FOR PRODUCING AN IMPROVED MOLDED THERMOPLASTIC ARTICLE

[75] Inventor: Ernst A. Egli, Carol Stream, Ill.

[73] Assignee: Standard Oil Company, Chicago, Ill.

[22] Filed: May 31, 1974

[21] Appl. No.: 474,890

Related U.S. Application Data

[62] Division of Ser. No. 149,022, June 1, 1971, abandoned.

[52] U.S. Cl. .................... 260/2.5 HA; 260/2.5 HB; 260/2.5 E; 260/42.24; 264/48; 264/53; 264/54; 264/328; 264/DIG. 5; 264/DIG. 14; 264/DIG. 83

[51] Int. Cl.$^2$ .................... C08J 9/04; C08K 3/10

[58] Field of Search ....... 260/2.5 HA, 2.5 E, 2.5 HB

[56] References Cited
UNITED STATES PATENTS 3,657,165 4/1972 Kawai ............................ 260/2.5 HA
3,668,155 6/1972 Raley ............................. 260/2.5 HA Primary Examiner—Wilbert J. Briggs, Sr.
Attorney, Agent, or Firm—Robert R. Cochran; Arthur G. Gilkes; William T. McClain

[57] ABSTRACT

A method for producing an improved molded thermoplastic polymeric resinous article comprising: introducing a heat plastified thermoplastic polymeric resinous material into a mold in the presence of a finely divided inorganic material; cooling said heat plastified thermoplastic polymeric resinous material; removing from said mold said cooled mold shaped thermoplastic polymeric resinous material having finely divided inorganic material incorporated therein.

5 Claims, No Drawings

METHOD FOR PRODUCING AN IMPROVED MOLDED THERMOPLASTIC ARTICLE

This is a division, of application Ser. No. 149,022, filed June 1, 1971, now abandoned.

BACKGROUND

Plastic has been used as a material of construction for various articles. Perhaps one of the more recent applications for plastic is its use as a material of construction for furniture and the like. It has been found that plastic can be molded to have a grained surface which is imperceptively different from that of wood. Generally for these applications the plastic is foamed rather than solid. A method of injection molding foamed or foamable plastics to produce fabricated articles is disclosed in U.S. Pat. No. 3,268,636, entitled "Method and Apparatus for Injection Molding Foamed Plastic Articles", issued Aug. 23, 1966.

Two problems have arisen in using foamed plastics as materials of construction for various molded articles. The first of these problems is that when plastics are molded, especially foamed plastics, there results a swirl-pattern in the surface of the finished article. Frequently when the finished article is furniture the swirl-pattern is noticeable in spite of the fact that the article is molded to have a grained surface.

The second problem is present when foamed articles are being produced by injection molding. More specifically, when a heat plastified plastic material which is being foamed by an active foaming agent is injected into a mold, a surface skin is formed by virtue of the fact that the heat plastified material contacts the mold walls which are below the heat plastifying temperature of the thermoplastic resin. However, after the mold has filled and the surface skin has formed, the foaming agent in the thicker uncooled section continues to produce gas. Concomitant with this continued gas production, small cells already formed migrate toward each other and combine to form larger cells. The end result, quite frequently, is that large voids are formed internally in the foamed article. These large voids are undesirable for two reasons. The first reason is that they frequently occur too close to the skin surface of the foamed article, and thus the skin surface is easily punctured. The second reason is that the voids substantially reduce the strength of the foamed article.

The invention of this disclosure allows the production of polymeric resinous articles, especially foamed polymeric thermoplastic articles which are substantially free of swirl-patterns in their surface as well as substantially free of large voids within the articles themselves.

SUMMARY OF THE INVENTION

A method for producing an improved molded thermoplastic polymeric resinous article comprising: introducing a heat plastified thermoplastic polymeric resinous material into a mold in the presence of a finely divided inorganic material; cooling said heat plastified thermoplastic polymeric resinous material; removing from said mold said cooled mold shaped thermoplastic polymeric resinous material having finely divided inorganic material incorporated therein.

The invention of this disclosure has been found to be effective in substantially reducing swirl-patterns in the surface of polymeric resinous articles, especially injection molded foamed polymeric resinous articles. In addition, the invention of this disclosure was found to be effective in promoting a more uniform cell size in injection molded foamed polymeric resinous articles.

PREFERRED EMBODIMENTS

The invention of this disclosure, in its most preferred form, includes injecting a heat plasticized thermoplastic polymeric resinous material into a mold in the presence of a finely divided inorganic material.

Thermoplastic polymeric resinous materials include chlorinated rubber, cellulose ethers and esters, e.g., ethyl cellulose, cellulose acetate, cellulose acetate-butyrate, homopolymers and interpolymers of monomeric compounds containing the $CH_2=C<$ grouping, such as olefins, e.g. ethylene, propylene, isobutylene, butene-1, vinyl halides, e.g., vinyl chloride and vinyl fluoride, vinylidene chloride; vinyl esters of carboxylic acids, e.g., vinyl acetate, vinyl stearate, vinyl benzoate, vinyl ethers, e.g., vinyl methyl ether, vinyl ethyl ether, vinyl isobutyl ether; chlorotrifluorethylene, hexafluoropropylene, unsaturated carboxylic acids and derivatives thereof, e.g., acrylic acid, methacrylic acid, methyl acrylate, methyl alpha chloracrylate, methyl methacrylate, acrylamide, acrylonitrile, methacrylonitrile, and interpolymers of the above-mentioned vinylidine monomers with alpha, beta-unsaturated polycarboxylic acids and derivatives thereof, e.g. maleic anhydride, diethyl maleate, dibutyl fumarate, diallyl maleate, dipropyl maleate, polyolefin, monopolymers, copolymers and terpolymers, etc. A preferred class of materials with which optimum results are obtained are rigid, relatively nonelastic, thermoplastic polymeric resinous materials such as homopolymers and interpolymers of vinyl chloride, e.g., polyvinyl chloride, vinyl chloride-vinyl acetate copolymer (87:13), vinyl chloride, acrylonitrilecopolymer (80:20); homopolymers of vinyidene aromatic hydrocarbons and ring halogenated derivatives thereof, e.g. styrene, o-chlorostyrene, p-chlorostyrene, 2,5-dichlorostyrene, 2,4-dichlorostyrene, p-methylstyrene, p-ethylstyrene, alphamethylstyrene, vinyl naphthalene and interpolymers of such vinylidene monomers with each other and with other vinylidene monomers in which the interpolymer contains at least 70% of the vinylidene aromatic hydrocarbon compound, e.g., a copolymer of 70% styrene and 30% acrylonitrile. As previously indicated, for many uses the most preferred resins are thermoplastic styrene polymers containing at least 70% by weight styrene in the structure.

Additional suitable thermoplastic resins include polycarbonates, e.g., the polymer from bisphenol A and diphenyl carbonate; polyoxymethylene (Delrin), oxymethylene-alkylene oxide copolymers, e.g., oxymethylene-ethylene oxide (95:5) or glycerine-propylene adduct molecular weight 3000 or butanediol 1,4-adipic acid polyester; Dacron (polyethylene terephthalate), nylon (e.g., polymeric hexamethylene adipamide), ABS terpolymers can be used, e.g., the terpolymer of 25% butadiene, 15% acrylonitrile and 60% styrene (a rigid ABS terpolymer), as well as other terpolymers containing 25 to 60% butadiene, 10 to 20% acrylonitrile, and 20 to 60% styrene.

The present invention is of particular value in preparing foamed articles from polyethylene (of high density, e.g., 0.960, medium density, e.g., 0.935 or low density, e.g., 0.914), polypropylene, copolymers of ethylene and propylene (e.g., 50:50 copolymer, 60:40 copolymer and 20:80 copolymer), regular or high impact polystyrene, acrylonitrile-butadiene-styrene terpolymer, polyvinyl chloride (preferably rigid polyvinyl chloride), copolymers of ethylene with minor amounts of alpha olefins having 4 to 10 carbon atoms such as butene-1 (e.g., 90:10 and 97.5:2.5) or octene-1 (96:4); terpolymers of ethylene, propylene and up to 5% of a nonconjugated polyolefin such as alloocimene, pentadiene-1,4 and dicyclopentadiene, e.g., a terpolymer of 60% ethylene, 39% propylene and 1% dicyclopentadiene or pentadiene-1,4.

There can also be prepared foamed articles from fluorocarbon polymers such as, polyhexafluoropropylene and tetrafluoroethylenehexafluoropropylene copolymers (e.g., 50:50).

When employing polystyrene there can be employed normal crystal grade polystyrene or high impact polystyrene or a mixture containing 5 to 95% normal crystal grade polystyrene and the balance high impact polystyrenes. When employing a thermoplastic styrene polymer it normally contains greater than 50% by weight of styrene and preferably at least 70% by weight of styrene in its structure. Preferably, the polystyrene is at least 10% high impact polystyrene. High impact polystyrenes are frequently prepared by polymerizing monomeric styrene in the presence of 2 to 15% by weight of a rubbery diene polymer or by polymerizing styrene in the presence of such amounts of a difunctional material. Examples of high impact styrene include a terpolymer of 5% acrylonitrile, 5% butadiene and 90% styrene; a copolymer of 5% butadiene and 95% styrene; the product made by polymerizing 95% of styrene in the presence of 5% of polybutadiene; a copolymer of 5% chlorosulfonated polyethylene and 95% styrene; a blend of 97.5% polystyrene and 2.5% polybutadiene; a blend of 95% polystyrene and 5% hydrogenated polybutadiene containing 35.4% residual unsaturation; polystyrene formed in the presence of 5% hydrogenated polybutadiene containing 4.5% of residual unsaturation, a blend of 95% polystyrene and 5% polyisoprene, a blend of 98% polystyrene with 2% rubbery butadiene-styrene copolymer, a blend of 85% polystyrene with 15% rubbery butadiene-styrene copolymer, and a copolymer of 99.5% styrene and 0.5 % divinyl benzene.

Unless otherwise indicated, all parts and percentages are by weight.

Generally, before it is heat plastified, the thermoplastic polymeric resinous material is in pellet form. The finely divided inorganic material is preferably mixed with such pellets in a drum type blender. Usually such mixing is done dry and without the use of an amordant. The mixture of finely divided inorganic material and thermoplastic polymeric resinous material pellets is then heat plastified and injected into a mold under typical operating conditions.

In the most preferred method of operating, a foaming agent is employed in conjunction with the finely divided inorganic material to obtain a foamed thermoplastic polymeric resinous material. The foaming agent may be a volatile liquid adsorbed on an adsorbent. As the adsorbent there can be employed any conventional adsorbent in finely divided form, such as silica gel, e.g., Cab-O-Sil and Hi-Sil, activated alumina, and activated carbon. The adsorbent is usually used in an amount of 0.1 to 15%, preferably 0.5 to 10% by weight of the polymeric resinous material, although up to 25 or 30% of adsorbent can be employed. The adsorbent is an inert filler of large surface area but small particle size, e.g., 200 mesh or below.

As the volatile liquid there can be used aliphatic hydrocarbons boiling between 10° and 150°C. and preferably between 30° and 90°C., e.g., petroleum ether (containing primarily pentane or hexane or a mixture of these hydrocarbons), pentane, hexane, isopentane, heptane, cyclohexane, cyclopentane, pentadiene and neopentane. Other volatile liquids include methanol, ethanol, methyl acetate, ethyl acetate, butane, acetone, methyl formate, ethyl formate, dichloroethylene, trichloro-monofluoromethane, perchloroethylene, dichlorotetrafluoroethane, isopropyl chloride, carbon tetrachloride, monochlorotrifluoroethylene, propionaldehyde, diisopropyl ether, dichloro-difluoromethane, a mixture of pentane with 5 to 30% of methylene chloride or other volatile lower halogenated hydrocarbon.

The amount of volatile liquid adsorbed on the adsorbent can vary from 5 to 150% or more based on the weight of the adsorbent. The amount of liquid adsorbed will depend upon the capacity of the adsorbent for the particular liquid. Normally, the adsorbent containing the volatile liquid will appear to be a dry powder. The volatile liquid employed should be one which is nonreactive with the particular polymeric resinous material to be expanded. The amount of volatile liquid will depend upon the extent of foaming desired. In general, the greater the amount of adsorbed volatile liquid in the polymer adsorbent mixture the more the expansion. It has been found that good expansion can be obtained using very small amounts of the volatile liquid.

Instead of adsorbing the volatile liquid on a filler, there can be employed conventional expansible thermoplastic materials such as expansible polystyrene containing 1 to 9% of one of the volatile liquids, e.g., Dow Pelespan 101 expansible polystyrene beads containing 6% pentane).

Various suitable chemical foaming or blowing agents and their gas release (i.e. decomposition) temperatures are set forth in the following table:

TABLE

| Foaming agent: | Gas release temperature, °C. |
|---|---|
| Azobisisobutyronitrile | 115 |
| N,N'-dimethyl-N,N'-dinitrosoterephthalamide | 105 |
| p,p'-Oxybis(benzenesulfonyl hydrazide) | 150 |
| Dinitrosopentamethylenetetramine | 185 |
| Azodicarbonamide | 200 |
| Sodium bicarbonate citric acid (4:3) | 140 |
| Urea-biuret (33:67) | 135 |
| Diazoaminobenzene | 100 |
| 1,6-di-n-decyl azobisformamide | 145 |
| 1,6-di-phenyl azobisformamide | 176 |
| Diphenyl 4,4'-di(sulfonyl azide) | 145 |
| p,p-Oxybis(N-nitroso-N-methyl benzenesulfonamide) | 130 |
| Tetramethylene dinitrosodimethyl urethane | 125 |
| p,p-Oxybis(benzenesulfonyl semicarbazide) | 210 |

TABLE-continued

| Foaming agent: | Gas release temperature, °C. |
|---|---|
| Benzene sulfonic acid hydrazide | 104 |
| β-naphthalene sulfonic acid hydrazide | 138 |
| Diphenyl sulfone-3,3'-disulfonyl hydrazide | 150 |
| Benzene 1,3-disulfonic acid dihydrazide | 145 |
| Benzene sulfonic acid N-phenyl hydrazide | 146 |
| 95% sodium bicarbonate and 5% melamine | 140 |
| Barium azodicarboxylate | 250 |

Additionally there can be used materials such as trihydrazinetriazine, sodium bicarbonate, benzene sulfonyl hydrazine, ammonium carbonate, ammonium bicarbonate and potassium bicarbonate.

Also in forming a foamed thermoplastic polymeric resinous material, there is preferably utilized a nucleating agent, e.g., in an amount of from 0.02 to 10%, preferably 0.4 to 5% of the weight of the polymer.

Conventionally, the nucleating agents are made up of two materials which react to form carbon dioxide and water. The two materials are normally used in approximately equivalent amounts. As the carbon dioxide liberating materials there can be used ammonium, alkali and alkaline earth carbonates or bicarbonates, e.g., ammonium bicarbonate, sodium bicarbonate, sodium carbonate, potassium bicarbonate, calcium carbonate. The other material is an acid or acid-reacting salt, preferably solid, which is sufficiently strong to liberate the carbon dioxide from the carbonate or bicarbonate. Generally, the acid has at least 3.0 milliequivalents of acidic hydrogen, and preferably at least 10.0 milliequivalents, per gram. The acid can be organic or inorganic. Suitable acidic materials include boric acid, sodium dihydrogen phosphate, fumaric acid, malonic acid, oxalic acid, citric acid, tartaric acid, potassium acid tartrate, chloroacetic acid, maleic acid, succinic acid, glutaric acid and phthalic acid. In place of the anhydrous acids or salts there can be used the solid hydrates, e.g., oxalic acid hydrate and citric acid monohydrate.

While not essential, there can also be added a wetting agent such as Bayol 35 (a petroleum aliphatic hydrocarbon white oil), kerosene having an average of at least 8 carbon atoms in the molecule, alkylphenolalkylene oxide adducts, e.g., Triton X-100 (t-octylphenol-ethylene oxide adduct having 10 ethylene oxide units in the molecule), sodium lauryl sulfate and sodium dodecylbenzene sulfonate. The wetting agent can be nonionic or anionic.

One mode of incorporating the foaming agent and the nucleating agent into the polymeric resinous material is by premixing the pelletized, solid, thermoplastic polymeric resinous material, e.g., high impact styrene polymer, with a minor amount of the nucleating agent and a minor amount of the adsorbent having adsorbed thereon a volatile liquid, (i.e., the foaming agent) which is nonreactive with and which has not more than a slight solvent action on the polymer. The volatile liquid should volatilize below the softening point of the polymer.

Generally, the concentration of finely divided inorganic material is found to be effective in the range of between about 0.001% to about 50% based upon the total weight of finely divided inorganic material and polymeric resinous material. The preferred concentration of finely divided inorganic material was found to be in the range of between 1.0% to about 10% based upon the total weight of finely divided inorganic material and polymeric resinous material. The most preferred concentration was about 5.0% to about 10.0% finely divided inorganic material based upon the weight of finely divided inorganic material and polymeric resinous material.

The term "finely divided" as used herein is intended to mean particles of a size which will pass through a 10 mesh sieve. However, preferred for this invention is a finely divided inorganic material which will pass through a 60 mesh sieve, and most preferred is a finely divided inorganic material which is about the size which will pass through a 200 mesh sieve.

Generally any finely divided inorganic material is found to effect the benefits earlier described. However, most preferred as inorganic materials are those selected from the group consisting of minerals containing naturally occuring silicates; a mixture of about 30% zinc sulfide and about 70% barium sulfate commonly known as Lithopone; calcium carbonate; and barium sulfate. The minerals of this invention containing naturally occuring silicates should contain a substantial amount of such silicates and preferrably they should contain a major portion of naturally occuring silicates. The following table is a representative example of several finely divided inorganic materials which were found to give the desired improvements. Specifically Lithopone, comprising about 30% zinc sulfide and 70% barium sulfate, was the most preferred inorganic material to reduce the swirl-patterns in the surface of an article, while 5% mica was most preferred to give a more uniform cell structure. The following table shows the various finely divided inorganic materials which were used and the effectiveness of each.

TABLE I

Evaluation of injection molded foamed polymeric resinous articles.

| Additive | Impact Polystyrene | | High Density Polyethylene | | Polypropylene | |
|---|---|---|---|---|---|---|
| | Cell Structure | Surface | Cell Structure | Surface | Cell Structure | Surface |
| Clay (ASP-200) | Same | Same | Same | Same | Better | Same |
| Clay (ASP-101) | Same | Same | Same | Same | Same | Same |
| Talc (Emtal 5.gg) | Same | Slightly Better | Same | Better | Same | Same |

TABLE I-continued

Evaluation of injection molded foamed polymeric resinous articles.

| Additive | Impact Polystyrene | | High Density Polyethylene | | Polypropylene | |
|---|---|---|---|---|---|---|
| | Cell Structure | Surface | Cell Structure | Surface | Cell Structure | Surface |
| Diatomaceous Earth | Same | Slightly Better | Same | Same | Better | Same |
| Lithopone 30% zinc sulfide, 70% barium sulfate | Same | Better | Better | Much Better | Same | Slightly Better |
| Sodium Bicarbonate | Same | Same | — | — | Same | Same |
| Barium Sulfate Barimite XF | Same | Slightly Better | Better | Better | Same | Same |
| Calcium Carbonate Chem Carb 44 | Slightly Better | Same | Better | Better | Same | Same |
| Aluminum Silicate AFTON | Same | Same | Same | Better | Same | Same |
| Calcium Silicate SILENE EF | Same | Slightly Better | Same | Better | Same | Same |
| Bentonite Clay | Slightly Better | Same | Same | Same | Same | Same |
| Mica (Alsibronz) No. 12 | Same | Slightly Better | Better | Same | Same | Same |
| Mica (Alsibronz) No. 21 | Slightly Better | Slightly Better | Better | Same | Same | Same |
| Allen-R | — | — | — | — | Same | Same |
| Arosil | — | — | — | — | Same | Same |

Note:
"Same" means not significantly improved over articles molded from the same polymeric resinous material without the finely divided inorganic material. "Slightly Better", "Better" and "Much Better" indicate an increasing improvement over articles molded from the same polymeric resinous material without the finely divided mineral powder.

EXAMPLE I

There is provided a screw extruder. Into the hopper of the extruder there is added the thermoplastic foamable composition (e.g., a mixture of polystyrene with a blowing agent such as 1.3% of citric acid and 1.7% sodium bicarbonate and 0.2% of Bayol 35 based on the polystyrene). The solid mixture is heated under high pressure in the extruder to above the decomposition temperature of the blowing agent, e.g. to 150°C., and the foamable mixture under high pressure, e.g. 1000 p.s.i. (although it can be much more, e.g. 2500 p.s.i. or 5000 p.s.i.) is passed through a nozzle into an accumulator (or transfer pot). The foamable composition then commences to foam in the accumulator under a pressure of 5 to 250 p.s.i., e.g. 50 p.s.i.

In place of the nozzle the extruder can be provided with a screen pack or other device which permits the foamable composition to enter the accumulator. A piston is slidably located between the accumulator and a hydraulic cylinder, as the foamable composition expands in the accumulator it forces the piston to go further up into the hydraulic cylinder. In this phase of the operation cycle the entrance to the mold is closed. Two platens are moved with the aid of pistons operating in hydraulic cylinders to open and close the mold halves. The mold also has conventional vents which aid in the removal of the gases released by the breaking of the bubbles adjacent the mold walls. The mold walls are at lower temperature than the foamed material entering the mold from the accumulator, e.g. 175°C. in the case of polypropylene.

When sufficient foamed plastic has formed in the accumulator mold the halves are brought together, the entrance to the mold is opened and a low pressure, e.g. 100 p.s.i. is applied from the hydraulic cylinder via the piston to force foamed plastic into the mold and form a container. Since the foamable plastic is being extruded at a much greater pressure from the extruder nozzle none of the foamed plastic is forced back into the extruder but instead it is forced into the injection mold. After formation of the container the mold halves are opened and the container removed.

In one specific instance in which polypropylene containing 1% of azobisisobutyronitrile and 10% Lithopone is extruded at a pressure of 1000 p.s.i. and a temperature of 182°C. the temperature of the foamed polypropylene in the accumulator at the time of injection of the foamed polypropylene into the mold is 175°C. The mold walls are at 20°C. The container has a wall thickness of 60 mils, the skin being 8 mils thick and the foamed portion 52 mils thick. The transfer molded foam has a density of 35 lbs./cu. ft. while the skin has a density of 52 lbs./cu. ft.

In another instance there is produced an injection molded foamed polystyrene article containing 5% Mica having an unfoamed skin with a density of 56 lbs./cu. ft. (The same as the starting polystyrene) while the foamed portion of the article (90% of the total thickness) has a density of 45.6 lbs./cu. ft.

In a third specific instance there is employed Pelespan 101 (polystyrene containing 6% pentane and 10% Lithopone).

The pressure at the extruder die is 1000 p.s.i. and the extrusion temperature is 160°C. The polystyrene is allowed to foam in the accumulator and is then injection molded into a cabinet door at a pressure of 100 p.s.i. The temperature of the foamed polystyrene going into the mold is about 150°C. and the mold is cooled to 10°C. by cooling water running through ducts in the mold. In this case the foamed polystyrene is forced into a cabinet door shaped channel in the mold so that both the inner and outer surfaces of the cabinet door as it is being formed are cooled by the mold. Thus there is formed a foamed polystyrene cabinet door having inner and outer external skins integral with the foamed core. The cabinet door is composed of a 4 mil thick impervious, unfoamed outer skin and a foamed core. The foamed core has a density of 30 lbs./cu. ft. and the skin a density of slightly over 60 lbs./cu. ft.

Having thus described the invention what is claimed is:

1. A foamed thermoplastic polymeric resinous article substantially free of swirl-patterns in its surface comprising:
    a thermoplastic polymeric resinous material selected from the group consisting of polystyrene, polypropylene, and polyethylene having a finely divided inorganic material comprising about 30% zinc sulfide and about 70% barium sulfate intimately associated therewith in a range between about 0.001% and about 50% based upon the total weight of the thermoplastic polymeric resin and the inorganic material.

2. The foamed thermoplastic polymeric resinous article substantially free of swirl-patterns in its surface of claim 1 wherein said inorganic material is present in a range of between about 1.0% and about 10% based upon the total weight of said thermoplastic polymeric resin and said inorganic material.

3. The article of claim 1 wherein the thermoplastic polymeric resinous material is polystyrene.

4. The article of claim 1 wherein the thermoplastic polymeric resinous material is polypropylene.

5. The article of claim 1 wherein the thermoplastic polymeric resinous material is polyethylene.

* * * * *